United States Patent
Lunde et al.

(10) Patent No.: US 9,528,350 B2
(45) Date of Patent: Dec. 27, 2016

(54) TECHNICAL SYSTEM, METHOD AND USES FOR DOSING OF AT LEAST ONE LIQUID TREATMENT MEANS INTO INJECTION WATER TO AN INJECTION WELL

(75) Inventors: Helge Lunde, Sandnes (NO); David Pinchin, Hundvag (NO)

(73) Assignee: SEABOX AS, Sandnes (NO)

( * ) Notice: Subject to any disclaimer, the term of this patent is extended or adjusted under 35 U.S.C. 154(b) by 477 days.

(21) Appl. No.: 13/996,144

(22) PCT Filed: Dec. 19, 2011

(86) PCT No.: PCT/NO2011/000348
§ 371 (c)(1),
(2), (4) Date: Jun. 20, 2013

(87) PCT Pub. No.: WO2012/087149
PCT Pub. Date: Jun. 28, 2012

(65) Prior Publication Data
US 2013/0264064 A1 Oct. 10, 2013

(30) Foreign Application Priority Data
Dec. 21, 2010 (NO) .................................. 20101793

(51) Int. Cl.
E21B 27/00 (2006.01)
E21B 43/20 (2006.01)
(Continued)

(52) U.S. Cl.
CPC ............. *E21B 43/017* (2013.01); *C02F 1/686* (2013.01); *E21B 27/00* (2013.01);
(Continued)

(58) Field of Classification Search
CPC .... E21B 27/00; E21B 41/0007; E21B 43/017; E21B 43/16; E21B 43/20; C02F 1/686
(Continued)

(56) References Cited

U.S. PATENT DOCUMENTS

| | | | | |
|---|---|---|---|---|
| 4,748,011 A | * | 5/1988 | Baize ................. | B01D 53/1456 423/228 |
| 6,171,483 B1 | * | 1/2001 | Eden .................. | B01D 21/0012 210/170.11 |

(Continued)

FOREIGN PATENT DOCUMENTS

| | | |
|---|---|---|
| DE | 2447246 A | 4/1976 |
| WO | 99/46474 A1 | 9/1999 |
| WO | 2007/035106 A1 | 3/2007 |

OTHER PUBLICATIONS

International Search Report issued in connection with PCT/NO2011/000348.

(Continued)

*Primary Examiner* — Matthew R Buck
(74) *Attorney, Agent, or Firm* — Conley Rose, P.C.

(57) ABSTRACT

Technical system (2; 2'), method and uses for dosing of at least one liquid treatment means (12) into injection water (16) to an injection well (22), wherein the technical system (2; 2') comprises: —an underwater line (14; 14') for transport of the injection water (16) from a shipment site (20; 48) for the injection water (16); and —at least one liquid-tight storage unit (10) containing the at least one liquid treatment means (12). The distinctive characteristic is that the at least one storage unit (10) is structured as a volumetrically flexible unit; —wherein said storage unit (10) is placed under water (6); and —wherein said storage unit (10) is connected, in a flow-communicating manner, to the underwater line (14; 14') for dosing of liquid treatment means (12) into the injection water (16) to the injection well (22).

14 Claims, 4 Drawing Sheets

Figure 1:
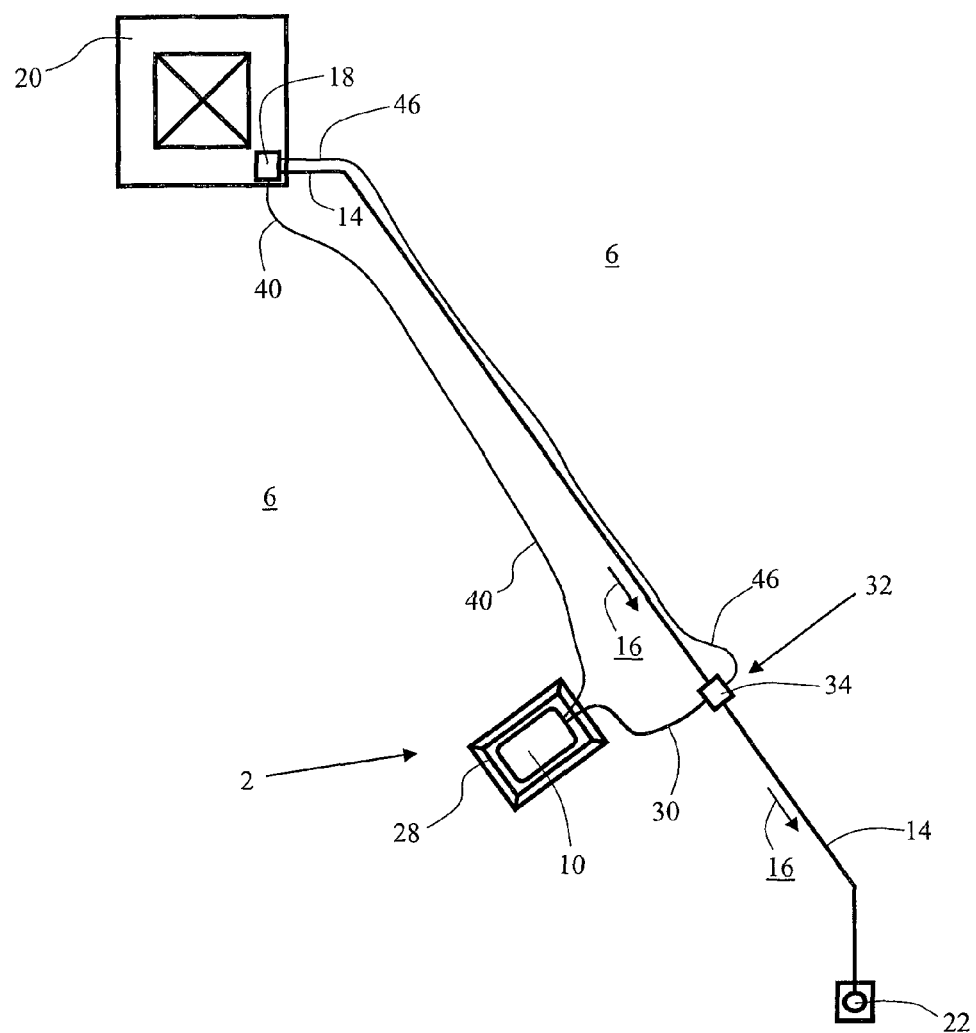

(51) Int. Cl.
*E21B 43/017* (2006.01)
*C02F 1/68* (2006.01)
*E21B 41/00* (2006.01)
*C02F 103/10* (2006.01)

(52) U.S. Cl.
CPC .......... *E21B 41/0007* (2013.01); *E21B 43/20* (2013.01); *C02F 2103/10* (2013.01)

(58) Field of Classification Search
USPC ........................................ 166/347, 268, 263
See application file for complete search history.

(56) References Cited

U.S. PATENT DOCUMENTS

| | | | | | |
|---|---|---|---|---|---|
| 6,776,188 | B1* | 8/2004 | Rajewski | .............. | B01F 5/0471 137/624.13 |
| 7,234,524 | B2* | 6/2007 | Shaw | ..................... | E21B 41/02 166/304 |
| 7,448,404 | B2* | 11/2008 | Samuelsen | ............ | B65D 88/78 137/236.1 |
| 7,604,051 | B2* | 10/2009 | Pinchin | .................. | E21B 43/40 166/266 |
| 7,963,335 | B2* | 6/2011 | Krehbiel | ............... | E21B 43/122 166/335 |
| 8,813,854 | B2* | 8/2014 | Sahni | ...................... | E21B 43/20 166/263 |
| 2003/0056955 | A1* | 3/2003 | Watson | ................... | E21B 37/06 166/305.1 |
| 2006/0060543 | A1* | 3/2006 | Appleford | .......... | B01D 21/0012 210/787 |
| 2006/0243670 | A1* | 11/2006 | Pinchin | .................. | C02F 1/688 210/748.11 |
| 2009/0301717 | A1* | 12/2009 | Lunde | .................. | C02F 1/4674 166/268 |
| 2011/0220354 | A1* | 9/2011 | Eikaas | .................. | B01F 3/1271 166/275 |
| 2012/0217195 | A1* | 8/2012 | Morgenthaler | ..... | E21B 43/0122 210/170.05 |

OTHER PUBLICATIONS

International Preliminary Report on Patentability issued in connection with PCT/NO2011/000348.
Response to Written Opinion filed in connection with PCT/NO2011/000348.
Written Opinion of the International Searching Authority issued in connection with PCT/NO2011/000348.

* cited by examiner

TECHNICAL SYSTEM, METHOD AND USES FOR DOSING OF AT LEAST ONE LIQUID TREATMENT MEANS INTO INJECTION WATER TO AN INJECTION WELL

This application is a national phase of PCT/NO2011/000348, filed Dec. 19, 2011, and claims priority to NO 20101793, filed Dec. 21, 2010, the entire contents of both of which are hereby incorporated by reference.

FIELD OF THE INVENTION

The invention concerns a technical system, a method and also two uses for dosing of at least one liquid treatment means into injection water to an injection well and, preferably, into a flow of injection water to an injection well.

Said dosing is carried out under water, and directly or indirectly into an underwater line transporting the injection water onwards to the injection well.

BACKGROUND OF THE INVENTION

The background of the invention relates to problems with the prior art in context of injection of water into subterranean hydrocarbon reservoirs in order to increase the degree of recovery from such reservoirs, so-called secondary recovery. Water injection, or water flooding, constitutes the most common method of increasing the degree of recovery of crude oil from a reservoir. During such water injection, the is object is to maintain the pressure in the reservoir and simultaneously force crude oil out of the reservoir via at least one production well positioned downstream of a waterflood front.

A further development of such a secondary recovery method is usually referred to as tertiary recovery. Such tertiary recovery may comprise, among other things, admixing of one or more chemicals, thereby arranging the injection water with one or more advantageous properties before the injection water flows through the injection well and further out into a subterranean oil reservoir. In this context, it is common, for example, to admix surface-active agents, so-called tensides ("surfactants"), into the injection water, thereby improving the washing properties of the water in the reservoir. Such surface-active agents reduce the surface tension of the crude oil, whereby the crude oil becomes more mobile and easier to wash out of the reservoir by means of an injection water front. Different, known types of surface-active agents are available and are used in this context.

PRIOR ART AND DISADVANTAGES THEREOF

During recovery of crude oil from a subterranean reservoir offshore, it is common to pump the injection water up from a proximate water source, for example surrounding seawater, and onwards to a surface installation. Such an installation may be comprised of a bottom-fixed platform or a floating installation, for example a floating platform or a production vessel. On the surface installation, the injection water will typically be subjected to various forms of further treatment, including various filtration and chemical treatment. During tertiary recovery, at least one liquid treatment means/chemical may also be added to the injection water, thereby improving the properties of the water before flowing through the injection well and the subterranean reservoir.

Treatment of the injection water on a surface installation offshore is encumbered with a number of technical, practical and economical disadvantages. The biggest disadvantage, however, is the erection of the very surface installation. In the event of being able to avoid using a surface installation for various treatment of the injection water offshore, this would, by itself, bring about large technical, practical and economical benefits. By so doing, smaller and/or complex oil fields being uninteresting and/or impossible to produce, as of today, could become profitable, among other things.

Employment of a surface installation offshore also implies that various equipment, materials and treatment means/chemicals have to be transported to and from, and possibly must be located on, the very installation. The reason for this is that such a surface installation has a limited weight- and storage capacity. Such a limited weight- and storage capacity is also applicable to equipment, materials and treatment means/chemicals for treatment of the injection water. This implies that surface installations offshore generally are encumbered with significant logistics problems and storage problems.

During water injection from such a surface installation offshore, it is common to use water flow rates in the order of several hundreds of $m^3$/hour. If a liquid tenside chemical is added to the injection water at a concentration of, for example, 0.5-3 percent by volume of the flow rate of the injection water, a need may arise on the installation for storing several hundreds of $m^3$/week of liquid chemicals. Obviously, this will represent a problem both in terms of logistics and storage on the installation.

Thus, and for the latter reasons, it would have been of great advantage if the liquid treatment means/chemical, possible also other injection-related equipment and means, could be placed under water, for example on a seabed or on the bottom of a lake, river or delta. By so doing, one would not be encumbered with the same weight- and space limitations typically applicable to surface installations offshore.

In this context it is known, from WO 2004/090284 A1, to use an underwater-placed apparatus for treatment of injection water. The apparatus comprises at least one receptacle containing at least one type of water-soluble solid-state chemical. Upon contact with the injection water, said solid-state chemical will dissolve gradually and mix with the injection water. Then the finally treated injection water may be pumped down into an injection well and out into an associated reservoir.

OBJECTS OF THE INVENTION

The primary object of the invention is to avoid or reduce the above-mentioned disadvantages of the prior art, or at least to provide a useful alternative to the prior art in context of secondary recovery, and particularly tertiary recovery, of crude oil from subterranean reservoirs.

Another object of the invention is to provide a technical solution for reducing, at least, some of the technical, practical and cost-related disadvantages associated with water injection from a surface installation offshore.

A more specific object of the invention is to be able to place liquid treatment means/chemicals for injection water, possible also other injection-related equipment and means, under water, for example on a seabed or on the bottom of a lake, river or delta. This will allow weight- and space limitations on surface installation offshore to be reduced.

GENERAL DESCRIPTION OF HOW THE OBJECTS ARE ACHIEVED

The objects are achieved by virtue of features disclosed in the following description and in the subsequent claims.

According to a first aspect of the invention, a technical system for dosing of at least one liquid treatment means into injection water to an injection well is provided, wherein the technical system comprises:

- an underwater line for transport of the injection water from a shipment site for the injection water; and
- at least one liquid-tight storage unit containing the at least one liquid treatment means. The distinctive characteristic of the technical system is that the at least one liquid-tight storage unit is structured as a volumetrically flexible or variable unit;
- wherein said storage unit is placed under water; and
- wherein said storage unit is connected, in a flow-communicating manner, to the underwater line for dosing of liquid treatment means into the injection water to the injection well.

Said storage unit must be volumetrically flexible/variable to avoid that the unit floats up when, during use, liquid treatment means is drawn off from the storage unit, but also for allowing a new treatment means to be filled into the storage unit.

Upon using such a submerged storage unit, having to use e.g. a surface installation for storage and dosing of the liquid treatment means into the injection water, is avoided. By so doing, the above-mentioned technical, practical and cost-related disadvantages associated with transport, storage and dosing of said treatment means into the injection water from such a surface installation, are also avoided or reduced. Moreover, this may contribute to render smaller and/or complex oil fields profitable, as mentioned above.

Furthermore, the present technical system comprises various connection equipment, for example valves, couplings, flanges, seals/gaskets, connection lines and—hoses, in order to connect, in a flow-communicating manner, the at least one storage unit to the underwater line. The technical system may also comprise various activation equipment, for example an actuator, and also one or more pumping means, various regulating equipment, one or more control units and possible monitoring equipment for activating, pumping, regulating, controlling and possibly monitoring, respectively, the discharge of the at least one liquid treatment means from said storage unit. Such equipment may also be used to activate, regulate, control and possibly monitor the dosing of said treatment means into the injection water to the injection well. In addition, the technical system may comprise various injection equipment for injecting, under pressure, the liquid treatment means into the injection water, insofar as injection water most likely will have a higher liquid pressure than the liquid pressure in the treatment means from the storage unit. Said equipment is to be considered as prior art and is not discussed in further detail herein. Besides, the technical system may be associated with a remote host facility offshore or onshore for remote control of the technical system, including transmission of control signals, monitoring signals and possible working power to equipment associated with the system. As an alternative or addition, the technical system may be structured so as to be more or less autonomous, for example by virtue of the system being provided with various means for controlling and driving activation equipment, regulating equipment, control units and possible monitoring equipment associated with the system. In this context, the technical system may also comprise communication means for cabled or wireless transmission of various signals between the storage unit and a remote surface installation offshore or onshore. For example, it may concern transmission of regular signals reporting the status and condition of the technical system, or transmission of program changes and/or program updates to an electronic control system for the present technical system. In addition, the technical system may also be associated with various auxiliary equipment in order to carry out, among other things, service works on the technical system, or on equipment associated with the system. Such auxiliary equipment may also comprise ROV-based equipment, in which an unmanned underwater vehicle ("ROV") carries out the particular service work by means of remote control from a host vessel on the surface. In the latter case, the particular equipment associated with the present technical system must also be structured for co-operation with said ROV-based equipment.

Further, and advantageously, said storage unit in the technical system may be placed on or at a water bottom, for example on or at a seabed or on the bottom of a lake, river or delta. In this context, the storage unit may possibly be placed on a suitable base.

In a first embodiment, said storage unit may be comprised of a bladder-shaped storage tank formed from a flexible material. Such a bladder-shaped storage tank is collapsible and expandable and will decrease or increase in volume, respectively, as a liquid treatment means is drawn off or filled into, respectively, the bladder-shaped storage tank.

Further, the flexible material may comprise at least one of the following materials: a plastics material; a rubber material; an elastomer material; and a plastomer-coated textile material. Thus, the storage tank may comprise, among other things, reinforced PVC-materials, neoprene rubber or similar materials advantageously structured with a high wear resistance.

It is known per se to use such flexible storage tanks on the surface for other purposes, for example for bulk storage of fuel, drinking water, rain water, contaminated water, liquid pollutions or fluidized waste products. With respect to fluidized waste products, it is also known, from WO 1999/046474, to place such a flexible and expandable storage tank on a seabed in order to sediment particulate material from a flow of drilling fluid emanating from a subsea well.

In a second embodiment, said storage unit may be comprised of a cylindrical storage tank comprising a rigid and cylindrical hull. The interior of the hull is provided with at least one movable lid connected, in a leakage-free manner, to the hull, the lid of which is structured in a manner allowing it to move in a longitudinal direction within the cylindrical hull.

In one variant, this cylindrical hull may be disposed standing vertically in the water. The interior of the hull is provided with a movable top lid connected, in a leakage-free manner, to the vertically-standing hull, the lid of which is structured in a manner allowing it to move in a vertical direction within the vertically-standing hull. When a liquid treatment means is drawn off or filled into, respectively, the vertically-standing storage tank, the top lid will move down or up, respectively, within the vertically-standing hull. Thereby, the vertically-standing storage tank is structured as a volumetrically flexible or variable unit. Such vertically-standing storage tanks are known per se when used on the surface for other purposes, for example for bulk storage of drinking water or hydrocarbon liquids.

In another variant, said cylindrical hull may be disposed lying horizontally in the water. The interior of the hull is provided with at least one movable end lid connected, in a leakage-free manner, to the horizontally-lying hull, the lid of which is structured in a manner allowing it to move in a horizontal direction within the horizontally-lying hull. When a liquid treatment means is drawn off or filled into, respectively, the horizontally-lying storage tank, said end lid will move inwards or outwards, respectively, within the horizontally-lying hull. Thereby, the horizontally-lying storage tank is structured as a volumetrically flexible or variable unit.

Further, the hull according to these variants may be comprised of a metallic material, wherein the inside of the hull is coated with glass, for example by virtue of the inside of the hull being fuse-coated with a suitable glass material. This ensures minimum chemical influence of the liquid treatment means onto the inside of the hull.

Yet further, the movable lid of the hull may be comprised of a metallic material, wherein the inside of the lid is coated with glass, for example by virtue of the inside of the lid being fuse-coated with a suitable glass material.

In a third embodiment, said storage unit may be comprised of a storage tank comprising several tank elements connected, in a movable and leakage-free manner, to each other. Such a storage tank is collapsible and expandable and will decrease or increase in volume, respectively, as a liquid treatment means is drawn off or filled into, respectively, the bladder-shaped storage tank.

For example, said tank elements may comprise longitudinal folds connected, in a movable and leakage-free manner, to each other. Thereby, the storage tank is formed as a collapsible and expandable bellows, for example a bellows having an accordion-shape or similar.

Moreover, said storage unit/-tank may comprise a regulation means for periodic dosing of liquid treatment means into the injection water to the injection well.

As an alternative, said storage unit/-tank may comprise a regulation means for continuous dosing of liquid treatment means into the injection water to the injection well.

Further, said shipment site for the injection water may comprise a surface installation. This surface installation may be located offshore, for example in the form of a bottom-fixed or floating platform, or in the form of a floating vessel, for example a production ship. The surface installation may also be located onshore, for example in the form of a land-based plant.

Yet further, the injection water from the surface installation may comprise water taken from a body of water within which the underwater line is located. This body of water may be comprised of water from a sea, lake, river or delta. As an alternative, the injection water may be comprised of produced water from a separation plant for crude oil or hydrocarbon condensate.

As an alternative or addition, said shipment site for the injection water may comprise at least one underwater installation for treatment of the injection water. Dependent on the type(s) of injection water treatment(s) to be carried out by the at least one underwater installation, and/or dependent on appropriate considerations in the particular situation, the present at least one underwater installation may be connected, in a flow-communicating manner, directly or indirectly to the underwater line. Thus, the present storage unit may be connected, in a flow-communicating manner, to an upstream or downstream side of the underwater installation, and/or the storage unit may be connected directly to said underwater installation, for dosing of at least one liquid treatment means into the injection water. In most situations it appears to be most appropriate, however, to dose liquid treatment means into a stream of treated injection water emanating from the underwater installation via the underwater line.

Such an underwater installation may also be associated with a remote host facility offshore or onshore for remote control of the underwater installation, including transmission of control signals, monitoring signals and possible working power to equipment associated with the underwater installation. As an alternative or addition, such an underwater installation may be structured so as to be more or less autonomous, for example by virtue of the underwater installation being provided with various means for controlling and driving activation equipment, regulating equipment, control units and possible monitoring equipment associated with the underwater installation. In this context, the underwater installation may also comprise communication means for cabled or wireless transmission of various signals between the underwater installation and a remote surface installation offshore or onshore. Also here it may, for example, concern transmission of regular signals reporting the status and condition of the underwater installation, or transmission of program changes/-updates to an electronic control system for the underwater installation.

In context of such an underwater installation, the injection water may comprise water taken from a body of water within which said underwater installation is located, for example water from a sea, lake, river or delta.

Further, said underwater installation may comprise at least one device for removal, without filtration, of solid particles from the injection water. An example of such an underwater device is described in WO 2007/035106 A1. This underwater device comprises a closed space structured so as to allow the supply water to be led directly into a lower portion of the closed space, the space of which is also structured so as to allow treated water to be led out of an upper portion of the closed space. This closed space also has a cross-sectional area structured so as to allow the water to flow from the lower portion to the upper portion at a flow velocity being sufficiently low for undesirable solid particles to precipitate from the water by means of gravitation. Further, this closed space may be formed as a receptacle or module being placed on, for example, a seabed or similar.

As an alternative or addition, said underwater installation may comprise at least one device for chemical treatment of the injection water. An example of such a chemical treatment device is described in WO 2004/090284 A1. This patent publication concerns a method and an apparatus for underwater chemical treatment of injection water, wherein a module-based underwater apparatus being connected to an injection well for injection of the water is used. The apparatus contains at least one receptacle provided with at least one type of water-soluble solid-state chemical. The receptacle may, for example, be replaced by means of a remote-controlled underwater vehicle ("ROV"). Then, the water is brought into contact with the solid-state chemical, whereby it is gradually dissolved and mixed with the water. The finally treated water is then injected into a reservoir associated with the well. By so doing, chemical treatment and water injection may be carried out without having to use an immediately overlying surface installation or—vessel. The water-soluble solid-state chemical may comprise chlorine and/or biocide, but also various other chemicals, such as oxygen scavengers, corrosion inhibitors and scale inhibitors. This chemical treatment device may be comprised of a separate unit or be incorporated in the above-mentioned underwater device for removal, without filtration, of undesirable solid particles from the supply water.

As a further alternative or addition, said underwater installation may comprise at least one device for destruction of organic material in the injection water. An example of such a destruction device is described in WO 2007/073198 A1. This patent publication concerns a method and a device for destructing organic material in injection water for an injection well. The device makes use of at least one electrochemical cell with associated operating means for in situ electrolytic generation, from water, of at least short-lived, free hydroxyl radicals. By means of the operating means, the electrochemical cell is structured in a manner allowing it to conduct the injection water therethrough as a source material for in situ generation of at least said free hydroxyl radicals from the injection water. Such free hydroxyl radicals will immediately destruct organic material engaged in the injection water. This destruction device may be comprised of a separate unit or be incorporated in the above-mentioned underwater device for removal, without filtration, of undesirable solid particles from the supply water. As a further alternative, the destruction device may be assembled together with the above-mentioned chemical treatment device.

Further, the injection well to which the present technical system is connected in a flow-communicating manner, may be a land-based well or a subsea well. It appears most appropriate, however, to use the present technical system in relation to an underwater injection well.

Yet further, the at least one storage unit may comprise at least one closable filling opening for filling of said liquid treatment means into the storage unit. As such, the filling opening may be associated with various valves, couplings, flanges, seals/gaskets and similar, and also associated with various activation equipment, regulating equipment, control units and possible monitoring equipment for activating, regulating, controlling and possibly monitoring, respectively, the filling of liquid treatment means into the storage unit. Such equipment is to be considered as prior art and is not discussed in further detail herein.

Thus, said closable filling opening may be structured in a manner allowing it to be connected to a filling line from the surface. It may also concern a temporary filling line which is lowered, when required, from a host vessel on the surface, and which is connected to the filling opening of the storage unit for filling of liquid treatment means into the storage unit. In this context, a remote-controlled underwater vehicle (ROV) may possibly be used to carry out the hook-up, and possibly to operate various equipment used in this respect.

As an alternative, the closable filling opening may be connected to a permanent filling line from the surface. As such, it may concern a filling line extending between the storage unit and a remote supply unit on the surface, for example a supply unit onshore or offshore. When offshore, such a supply unit may be located on a surface installation, for example in the form of a bottom-fixed or floating platform, or in the form of a floating vessel, for example a production ship.

Moreover, said liquid treatment means may comprise at least one of the following types of chemicals:
 a surface-active agent;
 an oxygen scavenger;
 a corrosion inhibitor;
 a scale inhibitor;
 chlorine;
 biocide; and
 a nitrate.

Further, the surface-active agent may be comprised of a surface-active polymer agent (surfactant polymer—SP). Yet further, the surface-active polymer agent may be comprised of an alkaline, surface-active polymer agent (alkali surfactant polymer—ASP).

Addition of nitrate in the injection water represents a relatively new method for treatment of injection water. In this context, it is most common to use calcium nitrate ($CaNO_3$) and sodium nitrate ($NaNO_3$). The purpose of such nitrate treatment is to stimulate the growth of nitrate-reducing bacteria in the injection water, which inhibits the growth of sulphate-reducing bacteria in the injection water. The latter sulphate-reducing bacteria are known to produce toxic and corrosive hydrogen sulphide gas ($H_2S$-gas), which causes undesirable corrosion of well- and processing equipment and also souring of subterranean hydrocarbon reservoirs. Nitrate treatment of injection water is considered to be a environmentally friendly method of inhibiting development of sulphate-reducing bacteria in injection water and in hydrocarbon reservoirs.

Additionally, and advantageously, the at least one storage unit may be enclosed by a protective structure, for example a protective jacket, so as to protect the storage unit against collision with external objects in the surrounding water, for example fishing gear and mooring equipment.

According to a second aspect of the invention, a method for dosing of at least one liquid treatment means into injection water to an injection well is provided, wherein the method makes use of a technical system comprising:
 an underwater line for transport of the injection water from a shipment site for the injection water; and
 at least one liquid-tight storage unit for said liquid treatment means. The distinctive characteristic of the method is that it comprises the following steps:
(A) structuring the at least one storage unit as a volumetrically flexible or variable unit;
(B) placing said storage unit under water;
(C) filling said liquid treatment means into said storage unit;
(D) connecting, in a flow-communicating manner, said storage unit to the underwater line; and
(E) dosing said liquid treatment means into the injection water.

Incidentally, the same comments mentioned in context of the preceding description of the technical system according to the first aspect of the invention, are also applicable to the present method according to this second aspect of the invention.

Advantageously, said storage unit may be placed on or at a water bottom, for example on or at a seabed or on the bottom of a lake, river or delta. In this context, the storage unit may possibly be placed on a suitable base.

Further, the liquid treatment means may be dosed periodically or continuously into the injection water to the injection well.

Yet further, the injection water may be shipped out from a surface installation located offshore or onshore.

In this context, the injection water from the surface installation may be taken from a body of water within which the underwater line is located.

As an alternative or addition, the injection water may be shipped out from at least one underwater installation for treatment of the injection water.

Also in the latter case, the injection water may be taken from a body of water within which said underwater installation is located.

Further, said underwater installation may comprise at least one device for removal, without filtration, of solid particles from the injection water, such as the underwater device described in WO 2007/035106 A1.

As an alternative or addition, said underwater installation may comprise at least one device for chemical treatment of the injection water, such as the chemical treatment device described in WO 2004/090284 A1.

As a further alternative or addition, said underwater installation may comprise at least one device for destruction of organic material in the injection water, such as the destruction device described in WO 2007/073198 A1.

In this context, the at least one storage unit may be connected, in a flow-communicating manner, to an upstream or downstream side of the underwater installation, and/or the storage unit may be connected directly to said underwater installation, for dosing of at least one liquid treatment means into the injection water.

Further, the injection well may be a land-based well or a subsea well.

Yet further, said liquid treatment means may be filled into the at least one storage unit via at least one closable filling opening in the storage unit.

Thus, said closable filling opening may be connected to a filling line from the surface, for example a temporary filling line from a host vessel on the surface, whereupon said liquid treatment means is filled into the storage unit. In this context, a remote-controlled underwater vehicle (ROV) may possibly be used to connect the closable filling opening to the filling line from the surface, and possibly also to operate various equipment used in this respect.

As an alternative, the closable filling opening may be connected to a permanent filling line from the surface, for example a filling line extending between the storage unit and a remote supply unit on the surface, for example a supply unit onshore or offshore.

Moreover, said liquid treatment means may comprise at least one of the following types of chemicals:
 a surface-active agent;
 an oxygen scavenger;
 a corrosion inhibitor;
 a scale inhibitor;
 chlorine;
 biocide; and
 a nitrate.

Further, the surface-active agent may be comprised of a surface-active polymer agent, for example an alkaline, surface-active polymer agent, whereas said nitrate may be comprised of e.g. calcium nitrate ($CaNO_3$) or sodium nitrate ($NaNO_3$).

In addition, the at least one storage unit may be enclosed by a protective structure, for example a protective jacket. By so doing, the storage unit is protected against collision with external objects in the surrounding water, for example fishing gear and mooring equipment.

According to a third aspect of the invention, a use of a technical system according to the first aspect of the invention is provided for dosing of at least one liquid treatment means into injection water to an injection well.

Finally, and according to a fourth aspect of the invention, a use of a method according to the second aspect of the invention is provided for dosing of at least one liquid treatment means into injection water to an injection well.

Hereinafter, non-limiting exemplary embodiments of a technical system according to the invention will be shown.

SHORT DESCRIPTION OF FIGURES OF THE EXEMPLARY EMBODIMENTS

Figure 2:
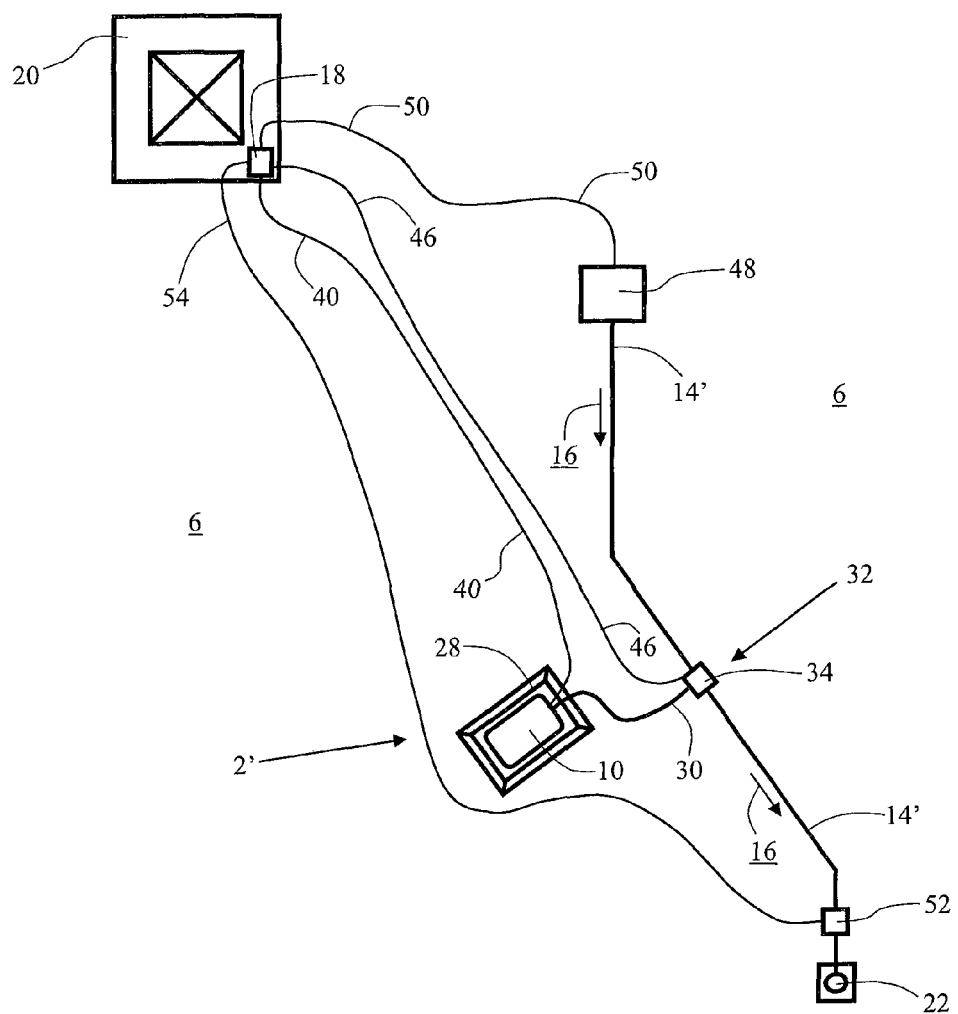
Figure 3:
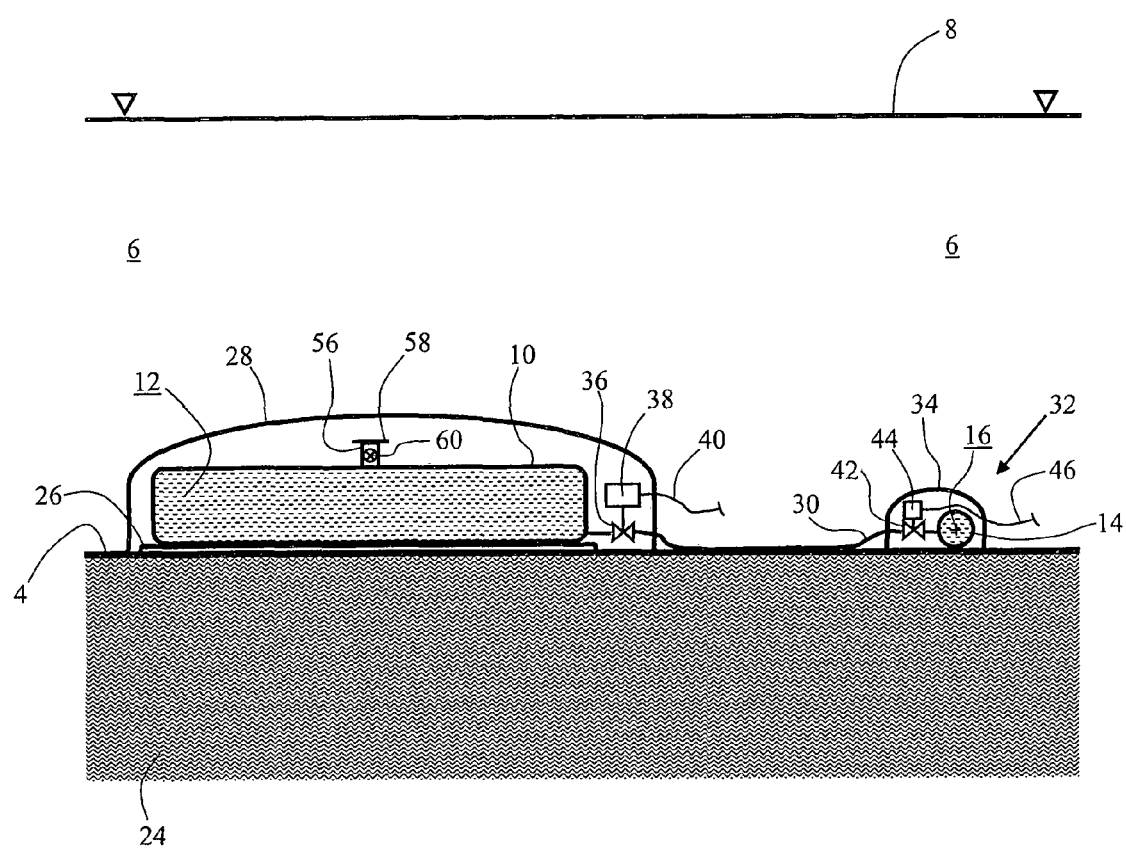
Figure 4:
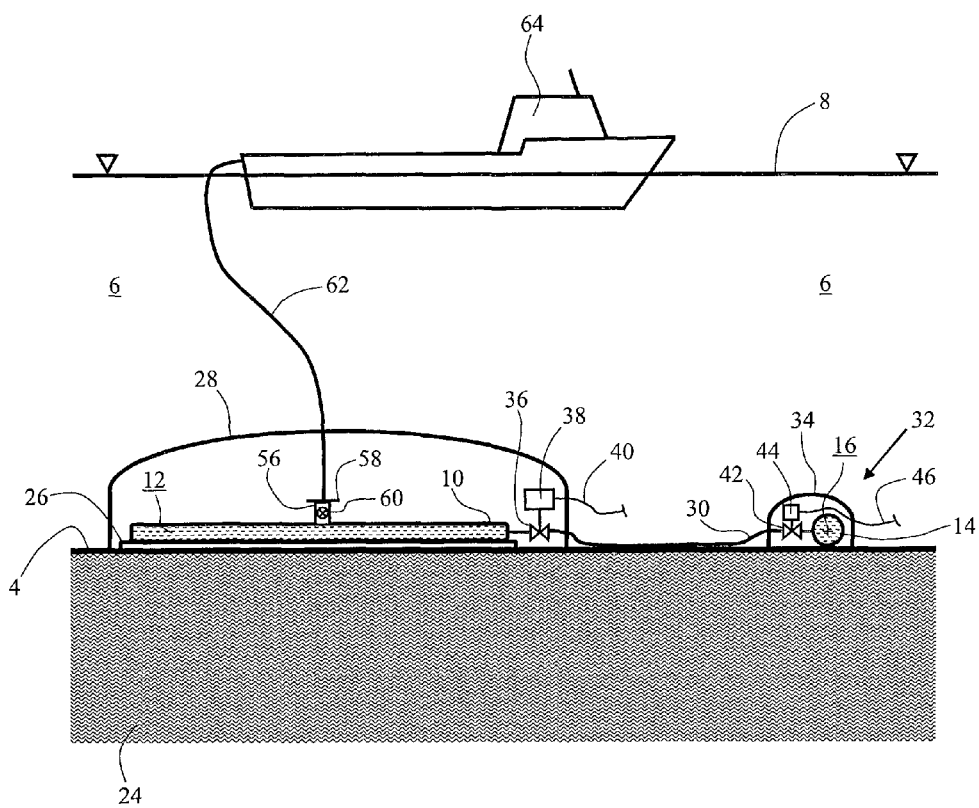

FIG. 1 shows a schematic plan view of a first embodiment of a technical system according to the invention placed on a seabed, wherein the system comprises a bladder-shaped, chemical-filled storage tank connected to an injection pipeline transporting injection water from an offshore platform and further onto an injection well on the seabed;

FIG. 2 shows a schematic plan view of a second embodiment of a technical system according to the invention placed on a seabed, wherein the system comprises a bladder-shaped, chemical-filled storage tank connected to an injection pipeline transporting injection water from a seabed-placed underwater installation and further onto an injection well on the seabed, the underwater installation being structured for various treatment of the water to be injected in the injection well;

FIG. 3 shows, in larger scale, a schematic front elevation of the bladder-shaped storage tank according to FIG. 1 or 2, wherein the storage tank is shown connected to said injection pipeline, wherein the storage tank is filled up with a liquid chemical, and wherein both the storage tank and the connection point on the injection pipeline are provided each with a protective structure; and FIG. 4 shows, also in larger scale, a schematic front elevation of the storage tank according to FIG. 3, but wherein the storage tank is almost empty of liquid chemical, and wherein a supply vessel is about to transfer liquid chemical from the vessel and down to the storage tank via a flexible filling line.

The figures are schematic and only show details and equipment being essential to the understanding of the invention. Further, the figures are much distorted with respect to relative dimensions of details and components shown in the figures. The figures are also very simplified with respect to the shape and richness of detail of such details and components. Hereinafter, equal, equivalent or corresponding details in the figures will be denoted with substantially the same reference numerals.

DESCRIPTION OF EXEMPLARY EMBODIMENTS OF THE INVENTION

FIG. 1 shows a first embodiment of a technical system 2 according to the invention placed on a seabed 4 underlying seawater 6 and a sea level 8. The technical system 2 comprises a bladder-shaped storage tank 10 formed from a flexible material and containing a liquid, surface-active chemical 12, which in this case is comprised of a surface-active polymer agent. The system 2 also comprises an injection pipeline 14 transporting injection water 16 from a first connection point 18 on an offshore platform 20 and further onto an injection well 22 on the seabed 4. In another embodiment (not shown), this first connection point may just as well be located onshore, for example on a land-based plant. In this first embodiment, surrounding seawater is pumped up to the platform 20 as supply water for the injection water 16. Hereinafter, both the supply water and the injection water will be denoted with reference numeral 16. Then injection water 16 containing a portion of the surface-active chemical 12 is pumped down into the injection well 22 and further out into an oil reservoir (not shown) in the subsurface 24. By so doing, the surface tension of the crude oil is reduced, whereby an injection water front flowing through the reservoir may force more crude oil out of the reservoir.

The bladder-shaped storage tank 10 is placed on a base 26 on the seabed 4 and is enclosed by a first protective structure 28 to prevent the storage tank 10 from being damaged by fishing gear, mooring equipment and similar. For dosing of the liquid chemical 12 into the injection water 16 flowing through the injection pipeline 14, the storage tank 10 is connected, in a flow-communicating manner, to the injection pipeline 14 via a connection line 30. This connection line 30 is connected, in a flow-communicating manner, to the injection pipeline 14 at a connection point 32 on the pipeline 14. Similar to the storage tank 10, this connection point 32 is enclosed by a second protective structure 34.

The storage tank 10 is also provided with an outlet valve 36 operationally connected to a first control- and regulating device 38 for timing- and/or amount-related control and regulation of the discharge rate of the chemical 12 from the storage tank 10. In this embodiment, the chemical 12 is dosed continuously into the flow of injection water 16 in the injection pipeline 14. Said control- and regulating device 38 may also be connected to a suitable pumping means (not shown) for transport of the liquid chemical 12 to the connection point on the pipeline 14. Further, the control- and regulating device 38 is connected to the platform 20 via a first control cable 40 ("umbilical line") for transmission of signals and possible working power to components and equipment associated with the storage tank 10.

Furthermore, the connection point 32 on the pipeline 14 comprises an inlet valve 42 with a second control- and regulating device 44 for control and regulation, among other things, of the inlet valve 42 and, hence, of the flow of chemicals therethrough. This control- and regulating device 44 also comprises various injection equipment (not shown), for example a suitable pumping means, connection nipples, injection nozzles and possible pipe connections/-loops, for allowing the liquid chemical 12 to be injected into the injection water 16 in the injection pipeline 14. The control- and regulating device 44 is also connected to the platform 20 via a second control cable 46 for transmission of signals and possible working power to components and equipment associated with the connection point 32.

FIG. 2 shows a second embodiment of a technical system 2' according to the invention. As a difference relative to the first embodiment of the invention, this technical system 2' comprises an injection pipeline 14' transporting injection water 16 from an underwater installation 48 placed on the seabed 4 and further onto the injection well 22. In this embodiment, surrounding seawater 6 is taken directly into the underwater installation 48 as supply water for the injection water 16.

In the underwater installation 48, the injection water 16 is subjected to various treatment before treated water is pumped onwards into the injection pipeline 14'. For the sake of simplicity, FIG. 2 shows only one underwater installation 48, but several such underwater installations 48 may be used, if desirable. In this manner, at least one such underwater installation 48 may comprise one or more devices for removal, without filtration, of solid particles from the injection water 16, as described in WO 2007/035106 A1. As an alternative or addition, the underwater installation 48 may comprise at least one device for chemical treatment of the injection water 16, as described in WO 2004/090284 A1. As a further alternative or addition, the underwater installation 48 may comprise at least one device for destruction of organic material in the injection water 16, as described in WO 2007/073198 A1.

Further, the underwater installation 48 is connected to said platform 20 via a third control cable 50 for transmission of signals and possible working power to components and equipment associated with the underwater installation 48.

In this embodiment, the injection pipeline 14' is also connected to an injection pump 52 placed on the seabed 4 in vicinity of the injection well 22. The injection pump 52 is connected to the platform 20 via a fourth control cable 54 for transmission of control signals and working power to the injection pump 52.

FIGS. 3 and 4 show equipment and components already discussed in context of FIGS. 1 and 2. In addition, FIGS. 3 and 4 show that the upper side of the flexible and bladder-shaped storage tank 10 is provided with a closable filling opening. In this embodiment, the filling opening is comprised of a vertical pipe stub 56 provided with a connection flange 58 and an internal ball valve 60. The vertical pipe stub 56 is structured in a manner allowing it to be connected to a flexible filling line 62 from a supply vessel 64 at the sea level 8, as shown in FIG. 4. In this context, a remote-controlled underwater vehicle (not shown) may be used to connect the filling line 62 to the connection flange 58 on the pipe stub 56, and to open or close the ball valve 60 in the pipe stub 56. Such a filling method may be used after initially having placed an empty storage tank 10 on its base 26 on the seabed 4, but also for subsequent filling of a liquid chemical 12 into the storage tank 10. FIG. 4 shows a collapsed storage tank 10 being almost empty of liquid chemical 12, but wherein the supply vessel 64 is about to transfer liquid chemical 12 therefrom and down to the storage tank 10 via the filling line 62. FIG. 3, however, shows the storage tank 10 after having been completely filled with the liquid chemical 12. The degree of filling of the storage tank 10 may possibly be measured, registered and transmitted to the platform 20. This may be carried out by means of suitable measuring-, registering- and signal transmission equipment connected to said first control- and regulating device 38 associated with the storage tank 10.

The invention claimed is:

1. A technical system for dosing of at least one liquid treatment means into injection water to an injection well, wherein the technical system comprises:
    an underwater line for transport of the injection water from a shipment site to the injection well; and
    at least one liquid-tight storage unit containing the at least one liquid treatment means, wherein the at least one liquid-tight storage unit is structured as a volumetrically flexible unit, and wherein the at least one liquid treatment means is configured to enhance the recovery of hydrocarbons in a subterranean reservoir;
    wherein said storage unit is placed under water, and wherein the at least one storage unit comprises at least one closable filling opening configured to be releasably coupled to a filling line for filling the storage unit with the at least one liquid treatment means under water; and
    wherein said storage unit is connected, in a flow-communicating manner, to the underwater line for dosing of the at least one liquid treatment means into the injection water to the injection well.

2. The technical system according to claim 1, wherein said storage unit is comprised of a bladder-shaped storage tank formed from a flexible material.

3. The technical system according to claim 1, wherein said shipment site comprises a surface installation.

4. The technical system according to according to 1, wherein said shipment site comprises at least one underwater installation for treatment of the injection water.

5. The technical system according to claim 4, wherein said underwater installation comprises at least one device for removal, without filtration, of solid particles from the injection water.

6. The technical system according to claim 4, wherein said underwater installation comprises at least one device for chemical treatment of the injection water.

7. The technical system according to claim 4, wherein said underwater installation comprises at least one device for destruction of organic material in the injection water.

8. The technical system according to claim 1, wherein said filling line extends from the surface.

9. The technical system according to claim 1, wherein said liquid treatment means comprises at least one of the following types of chemicals: a surface-active agent; an oxygen scavenger; a corrosion inhibitor; a scale inhibitor; chlorine; biocide; and a nitrate.

10. The technical system according to claim 9, wherein the surface-active agent is comprised of a surface-active polymer agent.

11. The technical system according to claim 1, wherein the at least one storage unit is enclosed by a protective structure.

12. A method for dosing of at least one liquid treatment means into injection water to an injection well, wherein the method makes use of a technical system comprising:

an underwater line for transport of the injection water from a shipment site to the injection well; and at least one liquid-tight storage unit for said liquid treatment means, the method comprises the following steps:

(A) structuring the at least one storage unit as a volumetrically flexible unit;

(B) placing said storage unit under water;

(C) releasably connecting a filling line to said at least one storage unit and filling said at least one storage unit with said liquid treatment means with said filling line after (B), wherein the at least one liquid treatment means is configured to enhance the recovery of hydrocarbons in a subterranean reservoir;

(D) connecting, in a flow-communicating manner, said storage unit to the underwater line; and (E) dosing said liquid treatment means into the injection water.

13. The method according to claim 12, wherein (C) comprises filling said liquid treatment means into the at least one storage unit via at least one closable filling opening in the storage unit.

14. The method according to claim 13, wherein (C) comprises releasably connecting said closable filling opening to said filling line from the surface.

* * * * *